US009450285B2

(12) United States Patent
Chong et al.

(10) Patent No.: US 9,450,285 B2
(45) Date of Patent: Sep. 20, 2016

(54) ATTACHMENT OF DEEP DRAWN RESONATOR SHELL

(71) Applicants: Yin-Shing Chong, Middletown, CT (US); Jari Taskila, Meriden, CT (US); Timothy Bernhardt, Cheshire, CT (US)

(72) Inventors: Yin-Shing Chong, Middletown, CT (US); Jari Taskila, Meriden, CT (US); Timothy Bernhardt, Cheshire, CT (US)

(73) Assignee: ALCATEL-LUCENT SHANGHAI BELL CO., LTD, Shanghai (CN)

( * ) Notice: Subject to any disclaimer, the term of this patent is extended or adjusted under 35 U.S.C. 154(b) by 192 days.

(21) Appl. No.: 14/307,095

(22) Filed: Jun. 17, 2014

(65) Prior Publication Data

US 2015/0364806 A1 Dec. 17, 2015

(51) Int. Cl.
*H01P 7/06* (2006.01)
*H01R 4/56* (2006.01)
*F16B 7/18* (2006.01)

(52) U.S. Cl.
CPC . *H01P 7/06* (2013.01); *F16B 7/18* (2013.01); *H01R 4/56* (2013.01); *Y10T 29/49018* (2015.01)

(58) Field of Classification Search
CPC ............ H01P 1/20; H01P 1/207; H01P 7/06; F16B 7/18; F16B 7/0466; F16B 7/00; F16B 9/02; F16B 9/026; H01R 4/56
USPC ........... 333/202, 227, 232; 439/14, 253–256, 439/781, 784; 24/279, 105, 136 B, 486, 453
See application file for complete search history.

(56) References Cited

U.S. PATENT DOCUMENTS

| 8,248,188 B2 * | 8/2012 | Wong ................. H01P 1/205 333/203 |
| 2009/0058566 A1 | 3/2009 | Jones et al. |

* cited by examiner

*Primary Examiner* — Benny Lee
*Assistant Examiner* — Albens Dieujuste
(74) *Attorney, Agent, or Firm* — Harness, Dickey & Pierce, P.L.C.

(57) ABSTRACT

The apparatus includes a base having a hole in a top surface, a fastener having a longitudinal section with the longitudinal section extending into the hole, and a shell. The shell has a connecting section connecting a first lateral surface section and a second lateral surface section. At least a portion of the first lateral surface section extends into the hole. The second lateral surface section extends away from the top surface of the base. The connecting section is disposed between the top surface of the base and a portion of the fastener. The connecting section has a first section and a second section, and the first section has a non-linear cross-section. The apparatus further includes a washer disposed between the portion of the fastener and the connecting section, and a portion of the washer engages the first section of the connecting section.

16 Claims, 3 Drawing Sheets

ATTACHMENT OF DEEP DRAWN RESONATOR SHELL

BACKGROUND OF THE INVENTION

Resonators in a cavity filter are sometimes an integrated piece with the filter body and sometimes a separate piece. When the resonator is not an integral component, special features have to be incorporated into the resonator or on the resonator pedestal on the filter body. One of these features facilitates electrical grounding of the resonator to the filter body. The grounding point of contact ideally has to be as stable as possible over extreme temperature excursion. Movement in the grounding contact point will result in frequency drift in the cavity filter. This movement is more pronounced in a deep drawn resonator (DDR) than a machine resonator. In particular, with DDRs of small size, it is harder to add a grounding pad or limiter stop due to insufficient space.

SUMMARY

At least one embodiment relates to an apparatus.

In one embodiment, the apparatus includes base having a hole in a top surface, a fastener having a longitudinal section with the longitudinal section extending into the hole, and a shell. The shell has a first lateral surface section and a second lateral surface section. The shell has a connecting section connecting the first lateral surface section and the second lateral surface section. At least a portion of the first lateral surface section extends into the hole. The second lateral surface section extends away from the top surface of the base. The connecting section is disposed between the top surface of the base and a portion of the fastener. The connecting section has a first section and a second section, and the first section has a non-linear cross-section. The apparatus further includes a washer disposed between the portion of the fastener and the connecting section, and a portion of the washer engages the first section of the connecting section.

In one embodiment, a portion of the first section contacts the top surface of the base.

In one embodiment, the first section has a curve, and the portion of the washer engaging the first section projects into a recess defined by the curve.

In one embodiment, the curve contacts the top surface of the base.

In one embodiment, the second section does not contact the top surface of the base, and is substantially parallel to the top surface of the base.

In one embodiment, the washer includes a flat section, and the projecting portion projects from the flat section towards the top surface of the base.

In one embodiment, the flat section does not contact the connecting section.

In one embodiment, the apparatus further includes a lock washer disposed between the portion of the fastener and the washer.

In one embodiment, the fastener is a bolt, the hole includes threads for engaging with the bolt, and the portion of the fastener is a head of the bolt.

In one embodiment, the first lateral surface section is a first cylinder, the second lateral surface section is a second cylinder, and a diameter of the second cylinder is greater than the first cylinder.

In one embodiment, the base is a pedestal.

At least one embodiment relates to a method of attaching a deep drawn resonator shell to a base.

In one embodiment, the method includes disposing a first lateral surface section of a shell in a hole formed in a top surface of a base. The shell includes a second lateral surface section extending away from the top surface of the base and a connecting section connecting the first lateral surface section and the second lateral surface section. The connecting section is disposed between the top surface of the base and a portion of the fastener. The connecting section has a first section and a second section, and the first section has a non-linear cross-section. The method further includes placing a washer on the connecting section, and fastening the shell to the base using a fastener that applies a compressive force to the washer such that the washer only contacts the first section.

In one embodiment, the fastening includes inserting a longitudinal section of a fastener into the hole in the top surface of the base.

In one embodiment, the first section has a curve, and the placing places the washer on the connecting section such that, after the fastening, a portion of the washer that contacts the first section projects into a recess defined by the curve and the curve contacts the base.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
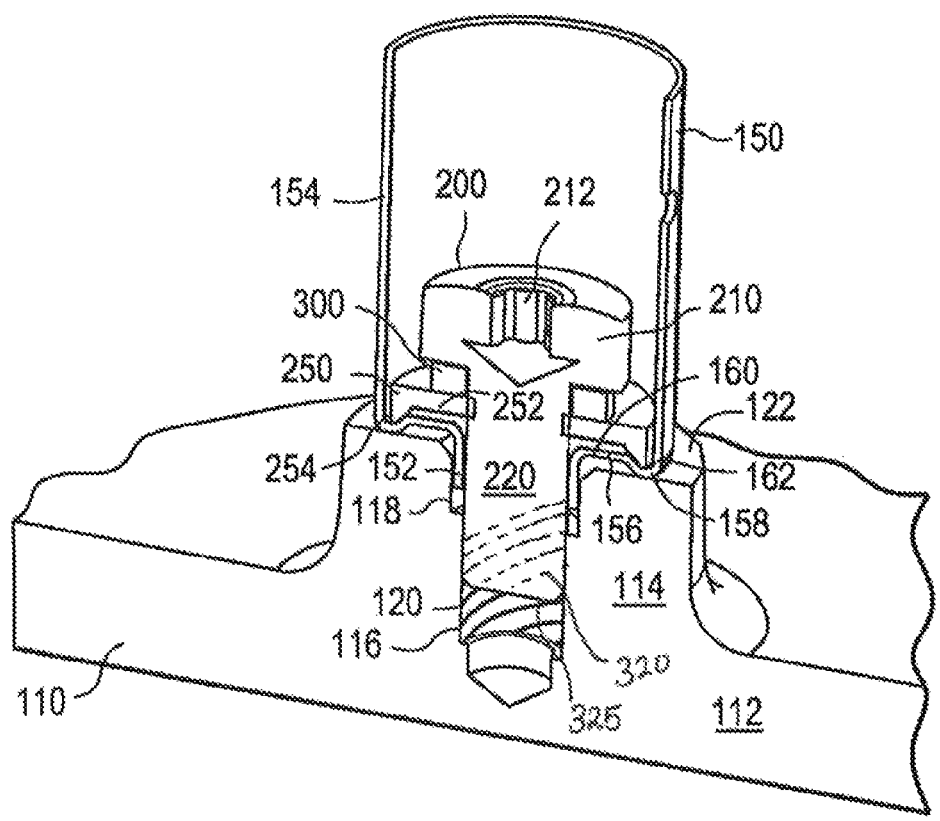
FIG. 1 illustrates a perspective, cross-sectional view of a deep drawn resonator shell attached to a base according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a perspective, cross-sectional view of a cavity resonator according to an example embodiment. As shown, a deep drawn resonator (DDR) shell 150 is attached to a base 110. In this example, the base 110 is a pedestal, but example embodiments are not limited to the base being a pedestal. The pedestal 110 has a base section 112 and mesa section 114. A hole 116 is formed in a top surface 122 of the pedestal 110, the top surface 122 of the mesa section 114 in particular. The hole 116 may extend into the base section 112. The hole 116 may include a first diameter section 118 and a second diameter section 120. The first diameter section 118 has a larger diameter than the second diameter section 120.

In the embodiment shown in FIG. 1, the base section 112 and the mesa section 114 are shown as having a cylindrical shape with the mesa section 114 having a smaller diameter than the base section 112; however, the example embodiments are not limited to this shape. The base section 112 and the mesa section 114 may be made of aluminum, a polymer, etc.

As shown in FIG. 1, the DDR shell 150 is disposed on the top surface 122 of the pedestal. The shell 150 has a first lateral surface section 152, a second lateral surface section 154 and a connecting section 156. The connecting section 156 connects the first lateral surface section 152 and the second lateral surface section 154. The shell 150 may be an integral body. The shell 150 may be made of a conductive material such as a metal (e.g., copper, gold, etc.), metal alloy (e.g., invar), etc.

The first lateral surface section 152 is disposed in the hole 116. In particular, the first later surface section 152 is disposed in the first diameter section 118 of the hole 116. In this embodiment, the first lateral surface section 152 has a hollow cylindrical shape, and a diameter of an outer lateral surface of the first later surface section 152 is about the same as the diameter of the first diameter section 118 of the hole 116. It will be understood that the example embodiments are not limited to this shape for the first lateral surface section 152.

The second lateral surface section 154 extends away from the top surface 122 of the pedestal 110. The second lateral surface section 154 has a hollow cylindrical shape, and the diameter of the second lateral surface section 154 is greater than the diameter of the first lateral surface section 152. However, the example embodiments are not limited to a hollow cylindrical shape for the second lateral surface section 154. For example, the second later surface section 154 may have a hollow mushroom shape.

The connecting section 156 has a first section 158 and a second section 160. The second section 160 is substantially flat and disk shaped. The first section 158 has a non-linear cross section. In particular, from the first to the second lateral surface sections, the first section 158 slants from the second section 160 towards the top surface 122 of the pedestal 110, and then curves away from the top surface 122. The curve defines a recess 162. As shown, the bottom portion of the curve contacts the top surface 122 of the pedestal 110. When viewing one-half of the cross-section of the connecting section 156, the connecting section 156 has a hook shape.

The cavity filter includes a fastener 200 to fasten the DDR shell 150 to the pedestal 110 by applying a compression force to a washer 250 via a lock washer 300. As shown the fastener 200 may be a bolt having a head 210 and a longitudinal section or shaft 220. The head 210 may have a disk shape, and may define a contoured recess 212 in a top surface. The contoured recess 212 (e.g., phillips, allen, hex, toms, etc.) mates with the head of a driving tool for rotating the bolt 200. The longitudinal section 220 may be cylindrical and have a diameter that substantially matches the diameter of the second diameter section 120 of the hole 116. The longitudinal section 220 may have male threads 320 that engage with female grooves 325 in the second diameter section 120. Accordingly, by rotating the bolt 200 in a first direction, the head 210 is drawn towards the top surface 122 of the pedestal 110. By contrast, rotating the bolt 200 in a second direction, opposite the first direction, forces the head 210 away from the top surface 122 of the pedestal 110. In one embodiment, the bolt 200 may be made of stainless steel. Furthermore, the example embodiments are not limited to using a bolt as the fastener 200. Other fasteners, such as friction based fasteners (e.g., tangs, rivets, etc.) may be used.

The washer 250 has a flat section 252 and a projecting portion 254 that projects from the flat section 252 towards the top surface 122 of the pedestal 110. The flat section 252 is annular, and the projecting portion 254 projects from an outer circumferential portion of a bottom surface of the flat section 252.

Figure 2:
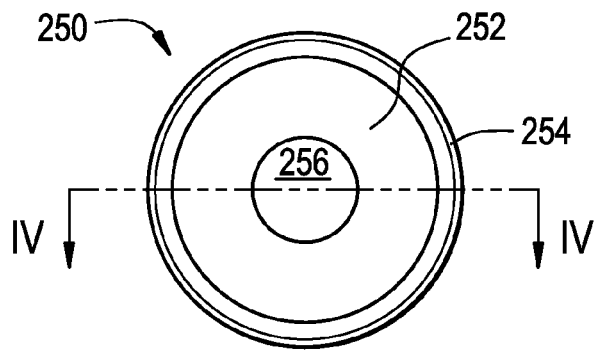
FIG. 2 illustrates a bottom view of the washer in FIG. 1.
Figure 3:
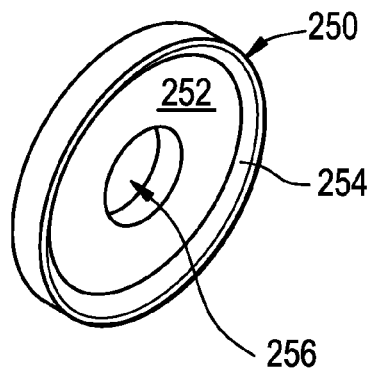
FIG. 3 illustrates a bottom perspective view of the washer in FIG. 1.
Figure 4:
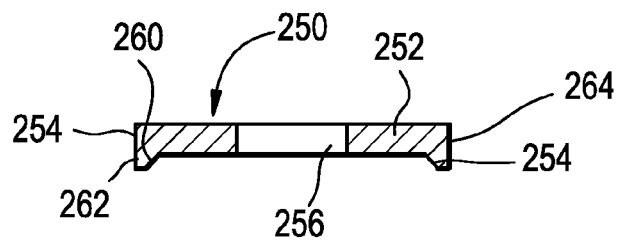
FIG. 4 illustrates a cross-section of the washer taken along line IV-IV in FIG. 2.

FIG. 2 illustrates a bottom view of the washer in FIG. 1, FIG. 3 illustrates a bottom perspective view of the washer in FIG. 1, and FIG. 4 illustrates a cross-section of the washer taken along line IV-IV in FIG. 2. As shown, the flat section 252 includes a hole 256 to accommodate passage of the longitudinal section 220 of the fastener 200. When viewing the cross-section of the projecting portion 254 at one side of the hole 256, the projecting portion 254 has a clipped, right triangle shape. Namely, a first leg 260 of the triangle slants down from the bottom surface of the flat section 252, while a second leg 262 of the triangle is aligned with an edge 264 of the flat section 252. The third leg is integral with the flat section 252 and forms a right angle with the second leg 262.

Returning to FIG. 1, as shown, the recess 162 of the curve in the first section 158 receives the projecting portion 254. The projecting portion 254 contacts the curve, and projects sufficiently from the curve in the first section 158 that the flat section 252 does not contact the connecting section 156. As shown, the flat section 252 is substantially parallel to the second section 160 of the connecting section 156. The washer 250 may be made of stainless steel, brass, or any other substantially non-magnetic material.

The lock washer 300 may be annular, and may have a hole of sufficient diameter to permit the longitudinal section 220 of the bolt 200 to pass there through. The lock washer 300 may be formed of stainless steel, brass, or any other substantially non-magnetic material.

Figure 5:
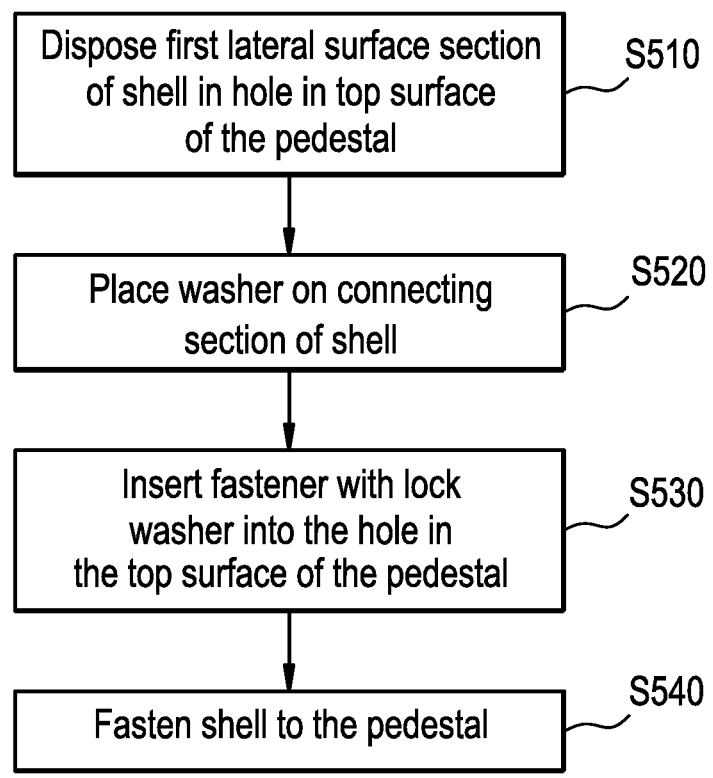
FIG. 5 illustrates a flow chart of a method of attaching a deep drawn resonator shell to a base.

Next, a method of attaching a DDR shell to a base according to an example embodiment will be described with respect to FIG. 1 and FIG. 5. FIG. 5 illustrates a flow chart of a method of attaching a DDR shell to a base according to an example embodiment. As shown, in step S510, the first lateral surface section 152 is disposed in the hole 116 in the top surface 122 of the base 110 (e.g., a pedestal). Then, in step S520, the washer 250 is placed on the connecting section 156 such that the projecting portion 254 projects into the recess 162 of the first section 158.

In step S530, the longitudinal section 220 of the fastener 200 (e.g., a bolt) with the lock washer 300 disposed thereon is inserted into the hole 116 in the top surface 122 of the pedestal 110. Next, in step S540, the shell 150 is fastened to the pedestal 110 by rotating the bolt 200 in a direction that draws the head 210 of the bolt 200 towards the top surface 122 of the pedestal 110. This results in the head 210 of the bolt 200 applying compressive force to the washer 250 such that the projection portion 254 of the washer 250 contacts the curved first section 158 of the connecting section 150 and the curved first section 158 securely contacts the top surface 122 of the pedestal 110.

The contact between the first section 158 and the pedestal 110 provides a grounding contact point. The structure of the washer 250 is such that a secure grounding contact point is obtained without deforming the shell 150; in particular, without deforming the connecting section 156 of the shell 150. As will be appreciated, the projection portion 254 spaces the flat section 252 away from the connecting section 156 such that deformation is prevented or at least reduced. Because the only contact point of the washer 250 is at the projecting portion 254, there is little to no risk of deflection or damage to the shell 150 due to uncontrolled torqueing.

The example embodiments being thus described, it will be obvious that the same may be varied in many ways. Such variations are not to be regarded as a departure from the invention, and all such modifications are intended to be included within the scope of the invention.

We claim:

1. An apparatus, comprising:
   a base having a hole in a top surface;
   a fastener having a longitudinal section, the longitudinal section extending into the hole;
   a shell having a first lateral surface section and a second lateral surface section, the shell having a connecting section connecting the first lateral surface section and the second lateral surface section, at least a portion of the first lateral surface section extending into the hole, the second lateral surface section extending away from the top surface of the base, the connecting section being disposed between the top surface of the base and a portion of the fastener, the connecting section having a first section and a second section, the first section having a non-linear cross-section; and
   a washer disposed between the portion of the fastener and the connecting section, a portion of the washer engaging the first section of the connecting section.

2. The apparatus of claim 1, wherein a portion of the first section contacts the top surface of the base.

3. The apparatus of claim 2, wherein the first section has a curve, and the portion of the washer engaging the first section projects into a recess defined by the curve.

4. The apparatus of claim 3, wherein the curve contacts the top surface of the base.

5. The apparatus of claim 3, wherein the second section does not contact the top surface of the base, and is substantially parallel to the top surface of the base.

6. The apparatus of claim 5, wherein the washer includes a flat section, and the portion of the washer projects from the flat section towards the top surface of the base.

7. The apparatus of claim 6, wherein the flat section does not contact the connecting section.

8. The apparatus of claim 2, wherein the second section does not contact the top surface of the base.

9. The apparatus of claim 1, wherein the washer includes a flat section, and the portion of the washer engaging the first section projects from the flat section towards the top surface of the base.

10. The apparatus of claim 1, further comprising:
    a lock washer disposed between the portion of the fastener and the washer.

11. The apparatus of claim 1, wherein the fastener is a bolt, the hole includes threads for engaging with the bolt, and the portion of the fastener is a head of the bolt.

12. The apparatus of claim 1, wherein the first lateral surface section is a first cylinder, the second lateral surface section is a second cylinder, and a diameter of the second cylinder is greater than the first cylinder.

13. The apparatus of claim 1, wherein the base is a pedestal.

14. A method of attaching a deep drawn resonator shell to a base, comprising:
    disposing a first lateral surface section of a shell in a hole formed in a top surface of a base, the shell including a second lateral surface section extending away from the top surface of the base and a connecting section connecting the first lateral surface section and the second lateral surface section, the connecting section being disposed between the top surface of the base and a portion of a fastener, the connecting section having a first section and a second section, the first section having a non-linear cross-section;
    placing a washer on the connecting section;
    fastening the shell to the base using the fastener that applies a compressive force to the washer such that the washer only contacts the first section.

15. The method of claim 14, wherein the fastening comprises:
    inserting a longitudinal section of Hall the fastener into the hole in the top surface of the base.

16. The method claim 14, wherein the first section has a curve, and the placing of the washer on the connecting section is such that, after the fastening, a portion of the washer that contacts the first section projects into a recess defined by the curve and the curve contacts the base.

\* \* \* \* \*